(12) United States Patent
Biermann et al.

(10) Patent No.: US 10,247,294 B2
(45) Date of Patent: Apr. 2, 2019

(54) DRIVE UNIT WITH AN ELECTROMOTIVE POWER UNIT AND A TRANSMISSION

(71) Applicant: SCHAEFFLER TECHNOLOGIES AG & CO. KG, Herzogenaurach (DE)

(72) Inventors: Thorsten Biermann, Wachenroth (DE); Philipp Storner, Moehrendorf (DE); Robert Schieck, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 116 days.

(21) Appl. No.: 15/476,451

(22) Filed: Mar. 31, 2017

(65) Prior Publication Data

US 2017/0284533 A1    Oct. 5, 2017

(30) Foreign Application Priority Data

Mar. 31, 2016 (DE) .................. 10 2016 205 263

(51) Int. Cl.
*F16H 57/029* (2012.01)
*B60K 1/00* (2006.01)
(Continued)

(52) U.S. Cl.
CPC ............. *F16H 57/029* (2013.01); *B60K 1/00* (2013.01); *B60K 17/165* (2013.01); *B60K 17/354* (2013.01); *F16J 15/3204* (2013.01); *H02K 5/124* (2013.01); *H02K 7/116* (2013.01); *B60K 2001/001* (2013.01); *B60Y 2200/90* (2013.01); *B60Y 2400/73* (2013.01); *F16H 1/46* (2013.01); *F16H 2057/02034* (2013.01)

(58) Field of Classification Search
CPC ....... F16J 15/3204; F16H 1/46; F16H 57/029; F16H 2057/02034; F16H 2057/02047; H02K 5/124; H02K 7/116; B60K 1/00; B60K 17/165; B60K 17/354; B60K 2001/001; B60Y 2200/90; B60Y 2400/73
USPC ............................................ 475/5, 149, 331
See application file for complete search history.

(56) References Cited

U.S. PATENT DOCUMENTS 5,053,661 A * 10/1991 Kitamura ............. F16J 15/3232
                                                277/565
5,879,259 A *  3/1999 Teraoka .................. F02B 39/06
                                                475/116
(Continued)

FOREIGN PATENT DOCUMENTS

DE       19841159 A1    1/2000
DE    102004033396 B4    1/2010
(Continued)

*Primary Examiner* — Leslie A Nicholson, III
(74) *Attorney, Agent, or Firm* — Brooks Kushman P.C.

(57) ABSTRACT

A drive unit includes a housing having first and second chambers. An electromotive drive is disposed in the first chamber and including a hollow rotor shaft. A transmission is disposed in the second chamber and includes an output shaft extending through the rotor shaft such that a gap is formed. The transmission further includes a gearing arrangement that operably couples the output shaft to the rotor shaft and reduces a speed ratio between the rotor shaft and the output shaft so that the output shaft rotates slower than the rotor shaft when operating. The gearing arrangement includes a first element fixed to the rotor shaft and a second element that rotates slower than the first element when operating. An annular clearance is defined between the first and second elements. An annular seal has a first portion engaging with the first element and a second portion engaging with the second element.

19 Claims, 3 Drawing Sheets

(51) Int. Cl.
*B60K 17/16* (2006.01)
*B60K 17/354* (2006.01)
*F16J 15/3204* (2016.01)
*H02K 5/124* (2006.01)
*H02K 7/116* (2006.01)
*F16H 1/46* (2006.01)
*F16H 57/02* (2012.01)

(56) References Cited

U.S. PATENT DOCUMENTS

| | | | | |
|---|---|---|---|---|
| 6,563,246 B1 * | 5/2003 | Kajiura | ................... | B60K 6/26 |
| | | | | 310/114 |
| 6,595,889 B2 * | 7/2003 | Minegishi | ............... | F16D 7/005 |
| | | | | 475/182 |
| 7,296,644 B2 | 11/2007 | Teraoka | | |
| 2009/0078528 A1 * | 3/2009 | Uzawa | ................ | B60K 7/0007 |
| | | | | 192/12 D |
| 2016/0146351 A1 * | 5/2016 | Janian | ................ | F16J 15/3228 |
| | | | | 277/560 |
| 2017/0232794 A1 * | 8/2017 | Abrahamson | ........ | B60K 17/165 |
| | | | | 301/137 |

FOREIGN PATENT DOCUMENTS

| | | | | |
|---|---|---|---|---|
| DE | 102015122519 A1 | | 6/2016 | |
| EP | 1914154 A1 * | | 4/2008 | ........... B60K 7/0007 |

\* cited by examiner

DRIVE UNIT WITH AN ELECTROMOTIVE POWER UNIT AND A TRANSMISSION

CROSS-REFERENCE TO RELATED APPLICATIONS

This application claims priority to DE Patent Application No. 10 2016 205 263.2, filed Mar. 31, 2016, the disclosure of which is incorporated in its entirety by reference herein.

TECHNICAL FIELD

This disclosure relates to a drive unit with an electromotive drive and a transmission, in which the output of the drive can be transferred via the transmission to at least one transmission output shaft of the drive unit and in which the transmission is provided with at least one rotating speed reduction stage.

In addition, the disclosure relates to a drive unit with a rotor shaft of an electromotive drive, with a transmission, which has at least one transmission output shaft of the drive unit and at least one seal. A first input shaft of a planetary drive of the transmission can be rotated about a central axis of the drive unit in a rotationally fixed manner with the rotor shaft and in rotationally uniform manner with the rotor shaft. The planetary drive is a speed reducer, in which first rotating speeds applied to the first input shaft can be reduced to respectively lower second rotating speeds with at least one reduction ratio. The second rotating speeds are applied to an output shaft of the planetary gear. The rotation axes of the rotor shaft, the transmission output shaft and the first input shaft are together coaxially supported by the central shaft. The planetary drive and the transmission output shaft are operationally connected via a sub-transmission. At least a gap formed between the rotor shaft and the transmission output shaft is sealed toward the transmission by means of the seal. The seal is rotationally fixed at a seal seat that is attached in a rotationally fixed manner to the rotor shaft and can be rotated with the rotor shaft.

BACKGROUND

A drive unit is disclosed by DE 198 41 159 A1. The drive unit is a compact unit mounted transverse in the motor vehicle and includes an electromotive drive and a transmission. In the drive unit, the output of the drive is transmitted via the transmission to two transmission output shafts of the drive unit. The transmission of the drive unit is formed by two sub-transmissions. A sub-transmission includes a rotating speed reduction stage, which involves a planetary drive. The second sub-transmission involves a differential. The input shaft of the planetary drive is a planet carrier that is connected with the rotor shaft of the electromotive drive rotating in the same direction. The rotation axis of the rotor shaft is supported on the central axis of the drive unit. The sun gear of the planetary drive is fixed at the housing of the drive unit. A set of planetary gears is meshing with the sun gear and a ring gear. The ring gear is the output shaft of the rotating speed reduction stage and is firmly connected with the cage of a differential. The cage and the ring gear can be rotated about the central axis of the drive unit. With the rotating speed reduction stage, first rotating speeds of the rotor shaft of the drive are reduced in second rotating speeds at the output shaft.

On the input side, the differential is provided with the differential cage, and on the output side with the transmission output shafts that can be rotated in relation to the rotor shaft. One of the transmission output shafts is coaxially guided through the hollow rotor shaft. The housing of the drive unit is divided in two chambers, one chamber housing the electromotive drive and the other the transmission.

Usually, gaps and other passages are formed between the different machine parts which are actively connected with one another or which are rotating in relation to one another. The gaps and passages must be sealed against any penetration of lubricating oil. Therefore, a radial shaft seal is arranged in an annular clearance in the drive unit, which annular clearance is located between the rotor shaft and the transmission output shaft. The radial shaft seal prevents lubricating oil transferring from the transmission chamber to the annular clearance. The heat generation of the electromotive drive can have the negative effect that the lubricating oil is coked.

SUMMARY

This disclosure has the objective of providing a drive unit with an optimized sealing arrangement.

The disclosure provides that the seal bridges an annular clearance leading to the gap and is attached in a sealing manner to a second input shaft. The second input shaft of the sub-transmission can be rotated with third rotating speeds, each of which is as high as the second rotating speeds or which are lower than the respective second rotating speeds of the output shaft of the speed reducer.

The input shaft of the speed reducer rotating synchronous with the rotor shaft rotates with the extremely high revolution speed of the rotor shaft. In the speed reducer, which is also called a reduction gear or rotating speed reduction stage, the rotating speeds applied at the input shaft or revolution speeds of the input shaft are reduced to rotating speeds or revolution speeds, which are applied at the output shaft of the speed reducer. Because of the reduction of the speed reducer, the rotating speeds or revolution speeds applied at the output shaft are lower than the rotating speeds at the power input. Because of the fact that the rotating speeds applied at the output of the speed reducer are lower than the rotating speeds of the first input shaft or rotor shaft, the sealing lip runs with considerably lower revolution speed/rotating speed at the sealing surface of the second input shaft, as if the seal would be arranged directly between rotor shaft and transmission output shaft, as is the case in well-known prior art.

One embodiment provides that the second input shaft has at least one sealing surface for the seal, wherein the second input shaft is connected with the output shaft in a rotationally fixed manner. Accordingly, the third rotating speeds of the second input shaft correspond to the reduced rotating speeds of the output shaft.

The following definitions for the description of the speed reducer or the rotating speed reduction stage apply: The revolution speed is a physical parameter, which indicates the frequency of revolutions of the respective input or output shaft. The revolution speed indicates how many revolutions the input or output shaft performs about the rotation axis per time unit. The rotating speed=angular velocity describes how fast the rotation angle changes during a revolution. The rotation angle is defined for one revolution of the respective shaft about the rotation axis at $2\pi=360°$. During a uniform rotation of the input shaft or output shaft about their rotation axes their revolution speeds and angular velocities are constant. It is assumed that when a vehicle is operated with the inventive drive unit the rotations of the rotor shaft will frequently vary. The respective revolution speeds change per time unit when the rotation is accelerated. For example, when starting the electromotive drive or when the transmission output shafts are delayed because of increased driving resistances. Since the torques applied at the rotating input shaft and rotating output shaft are respective ratios from the applied driving power of the electromotive drive and rotating speed, the torques applied at the input shaft of the speed reducer are lower than those that are simultaneously applied at the output shaft. At the same time, it is assumed that the same output is applied at the input shaft and the output shaft. Internal losses due to bearing friction or efficiency rate of the speed reducer are left unconsidered. Therefore, the term "speed reducer" or "rotating speed reduction stage" represents a transmission in which the physical parameters revolution speed or rotating speed applied at the input shaft are converted to a different value of the same respective parameter at the output shaft. The speed reducer is provided either with a fixed reduction ratio or it can be switched and has two or more optionally switchable fixed reduction ratios. For example, the rotating speed reduction stage involves a planetary drive or a planetary stage of the planetary drive. It is the object of the speed reducer/rotating speed reduction stage to reduce the extremely high drive speeds of the electromotive drive to lower drive speeds in the transmission. Therefore, the term reduction ratio represents an overall transmission ratio of the speed reducer of drive revolution speed or drive rotating speed to output revolution speed or output rotating speed, the absolute value of which is lower than 1, i.e., $|i|>1$.

It is provided that the first input shaft is a sun gear of the first planetary drive and that the second input shaft is a second sun gear of a second planetary drive. The second planetary drive is a component of the sub-transmission. The first sun gear is provided with the inner cylindrical seal seat. The second sun gear has a sealing surface.

The drive unit has two, or optionally three seals. A first seal seals a first annular clearance that is formed between the second input shaft and a transmission output shaft of the input unit. The annular clearance is bridged radially by means of the first seal. The annular seal leads to a gap that is formed radially between the hollow rotor shaft and the transmission output shaft. The second seal bridges, in a sealing manner, a further annular clearance that is formed at least partially between the first input shaft and the second input shaft. The second seal attaches to the first input shaft and runs with at least one sealing lip on the second input shaft when the drive unit is operating. Such an arrangement ensures that the lubricating oil does not penetrate the gap between the rotor shaft and the transmission output shaft or moves through the gap or is coked in the annular.

The drive unit is a compact unit including the electromotive drive, the transmission and the transmission output shafts. The transmission is divided into two sub-transmissions, in which the first sub-transmission involves a planetary drive designed in the form of a rotating speed reduction stage. The other sub-transmission includes a second planetary drive and a differential. For example, each of the transmission output shafts is connected with a powered vehicle wheel of a vehicle axle.

The first sub-transmission involves a planetary drive with a first sun gear, a first planet carrier, a set of first planetary gears and a first ring gear. The sun gear is fixed on the rotor shaft and is the input shaft of the rotor shaft. Alternatively, the input shaft can also be a planet carrier, which is connected in torque-proof manner with the rotor shaft. The set of planetary gears can be rotated at the planet carrier. The first planetary gears are meshing with the first sun gear and the first ring gear. The ring gear is attached at the housing of the drive unit or alternatively fixed in any way in relation to the housing. Alternatively, the ring gear can also be arranged in such a way that it can be rotated about the rotation axis or central axis of the rotor shaft in relation to the rotor shaft. In this case, the ring gear involves an output shaft of the rotating speed reduction stage. However, in other embodiments, the output shaft is the first planet carrier of the rotating speed reduction stage and, accordingly, can be rotated about the central axis in relation to the rotor shaft. The first sun gear has a first seat for the second seal.

The second sub-transmission includes a second planetary drive, which is arranged in the power path of the electromotive drive toward the transmission output shafts between the first planetary drive and the differential. The second planetary drive may include a second sun gear connected in a rotationally fixed manner with the first planet carrier. Accordingly, the first planet carrier and the second sun gear are arranged in the transmission so that they can rotate together about the rotation axis in relation to the rotor shaft. A second set of planetary gears meshes with the second sun gear and a second ring gear that is fixed at the housing of the drive unit. The second planet carrier is connected in a rotationally fixed manner with the housing of the differential and can be rotated together with the housing about the rotation axis or central axis in relation to the rotor shaft. The second sun gear is provided with a seat for the first seal. In addition, a sealing surface is formed at the second sun gear, and at least one sealing lip of the second seal is attached at said sealing surface. Alternatively, it is possible that the first sun gear includes the sealing surface for the second seal and the second sun gear is provided with a seat for the first seal and with a seat for the second seal. It is also possible that the seat for the first seal is formed on the side of the transmission output shaft and the second sun gear optionally includes two sealing surfaces or one sealing surface for the first seal and one seat for the second seal.

The differential may be a bevel gear differential, which has swivel-mounted compensating gears and output gears with a conical tooth system in its housing. Alternatively, the differential involves a spur-gear differential. The spur gear differential may include a differential cage in the form of a planet carrier, two compensation sets in the form of planetary gears and two output gears in the form of sun gears. The planetary gears are mounted on the planet carrier and can be rotated independent of each other about their own axis. However, one planetary gear of a first compensation set is respectively meshing with a planetary gear of the second compensation set. The planetary gears of the first compensation set are meshing with one sun gear and the planetary gears of the second compensation set are meshing with the other sun gear of the differential. Each sun gear is connected with one of the transmission output shafts.

In such sealing arrangements, it is preferred to use radial shaft seals, which consist of a basic body and at least one sealing lip. It is also possible to use seals with multiple sealing lips. Preferably, the basic bodies are reinforced.

In the drive unit, which is described in the background, a radial shaft seal is used, which is positioned in the rotor shaft and runs with the sealing lip on the surface of the transmission output shaft. When the drive unit is operated, the seal is rotating with the revolution speeds of the rotor shaft. However, the sealing lip of the seal glides on the transmission output shaft with a relative speed, which speed results from the speed differences of the rotor shaft and the transmission output shaft. Because of the fact that the rotor shafts of electric motors are usually extremely high, the sealing lip is exposed to high circumferential speeds. Furthermore, the sealing lip is to some extent exposed to such high centrifugal forces that it is lifted from the sealing surface and with high rotational speeds the sealing effect of a contact seal is cancelled. At this point, a radial shaft seal is exposed to high stresses and wear. The high speeds make the use of radial shaft seals only possible to a limited extent. In some cases, the use of radial shaft seals is at this point excluded for functional reasons. It is therefore common to use in such cases complex seals, which have an expensive design and are made of expensive materials.

In contrast, the sealing arrangement in the drive unit of this disclosure stands out favorably. While the seal located at the first input shaft continues to rotate with the drive speed or rotating speed of the rotor shaft, the second input shaft runs only with a low revolution speed/rotating speed. The lower revolution speed/rotating speed results from the reduction of the first planetary drive (rotating speed reduction stage). Therefore, the relative revolution speeds/relative rotating speeds between the first input shaft and the second input shaft are considerably lower than the relative revolution speeds/relative rotating speeds between the rotor shaft and the output drive gear extending through the rotor shaft. The wear between the sealing lip and the sealing surface is reduced. Lower relative revolution speeds or relative rotating speeds result in lower centrifugal forces at the sealing lip so that the sealing lip has a sealing contact in all speed ranges.

DETAILED DESCRIPTION

Figure 1:
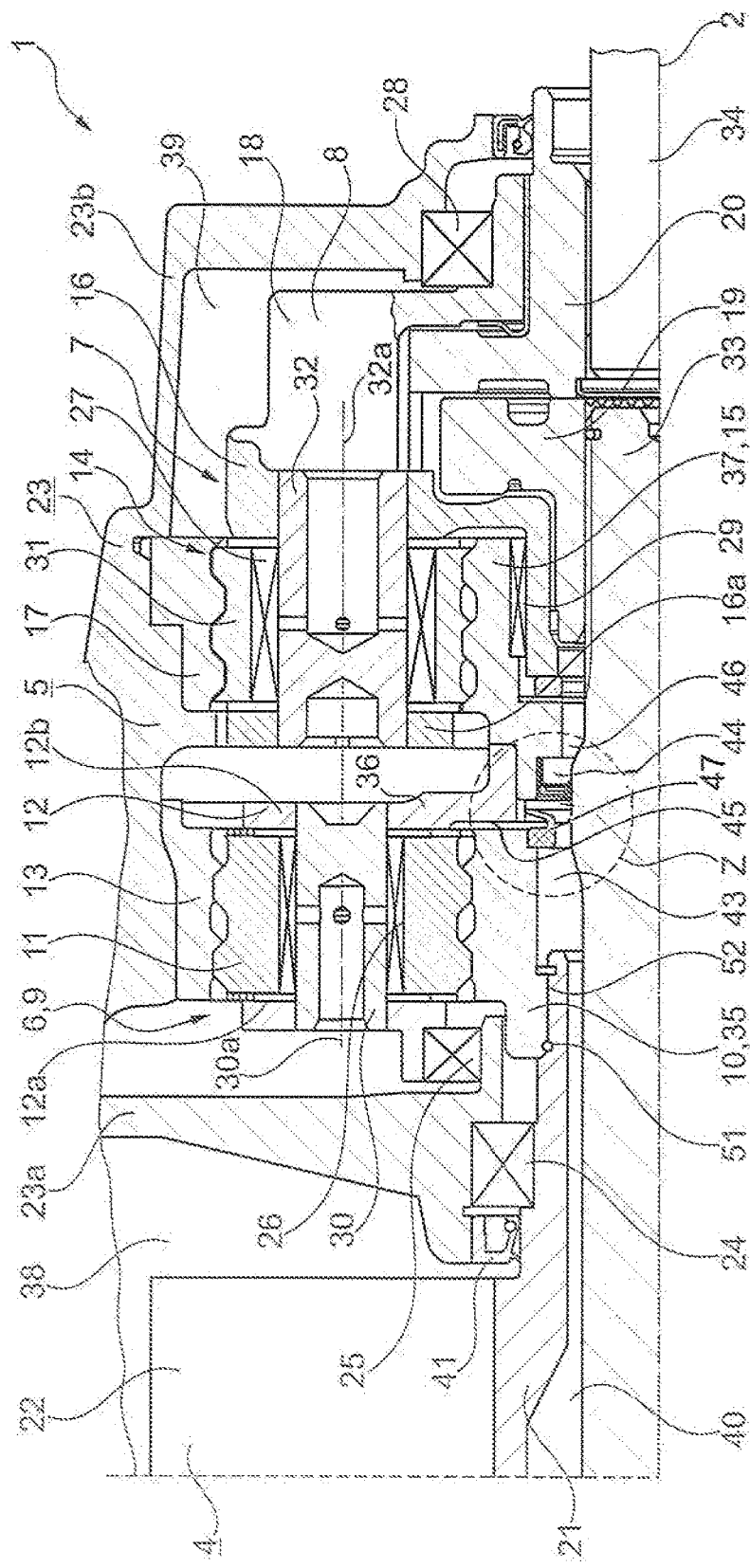
FIG. 1 shows a drive unit. The drive unit 1 is partially shown in a partial section along the rotation axis 2.

Referring to FIG. 1, the drive unit 1 is provided with an electromotive drive 4 (such as an electric motor) and a transmission 5. The drive 4 and the transmission 5 are located in the housing 23 (partially shown) of the drive unit 1, which includes the housing parts 23a and 23b. Of the electromotive drive 4, a rotor shaft 21 and a rotor 22 are depicted only partially. The transmission 5 is composed of a rotating speed reduction stage 6, a sub-transmission 7 with a differential 8. The rotating speed reduction stage 6 is a first planetary drive 9, with a first sun gear 10, a set of planetary gears 11, a first planet carrier 12 and a first ring gear 13. Of the set of planetary gears 11, FIG. 1 depicts only one planetary gear 11. The sub-transmission 7 comprises a second planetary drive 14 and the differential 8. The second planetary drive 14 comprises a second sun gear 15, a set of second planetary gears 31, a second planet carrier 16 and a second ring gear 17. Of the set of second planetary gears 31, FIG. 1 shows only one planetary gear 31. The differential 8 has a housing 18, in which swivel-mounted compensating gears 19 and output gears 20 are located. In FIG. 1, the compensating gears are covered by the housing 19 and the output gears 20 are therefore not visible.

The rotor 22 is positioned on the rotor shaft 21. On the side of the transmission, the rotor shaft 22 is mounted with a rolling bearing 24 in the first housing section 23a and can be rotated about the rotation axis 2 (central axis). The first planet carrier 12 of the first planetary drive 9, which comprises two sides 12a and 12b and which is supported on the drive side by means of a rolling bearing 25 via the first side 12a on the first housing section 23a and can be rotated about the rotation axis 2 or central axis 2 in relation to the rotor shaft 21. The first planetary gears 11 are supported with first planetary bolts 30 at the first planet carrier 12 and mounted with a respective rolling bearing 26 to be rotated about the bolt axis 30a. Each first planetary gear 11 is meshing with the first sun gear 10 and with the first ring gear 13.

The second planet carrier 16 is provided on one side with a mounting plate 16a and on the other side it is firmly connected with the housing 18 of the differential 8. The second planetary gears 31 are supported with second planetary bolts 32 at the second planet carrier 16 and mounted by means of a rolling bearing 27 to be rotated about the bolt axis 32a. Each second planetary gear 31 is meshing with the second sun gear 15 and the second ring gear 17. Together with the second planet carrier 16, the housing 18 of the differential 8 is mounted with a rolling bearing 28 at the housing 23 of the drive unit 1 and can be rotated about the rotation axis 2 or central axis 2 in relation to the rotor shaft 21. The second sun gear 15 is mounted with a rolling bearing 29 on the second planet carrier 16 and can be rotated about the rotation axis 2 or about its axial extension in relation to the rotor shaft 21.

The output gears 19 and 20 are located in the housing 18 of the differential 8 and can be rotated coaxially to the rotation axis 2 or central axis in relation to the rotor shaft 21 and in relation to each other. A first transmission output shaft 33 is positioned in rotationally fixed manner in the first output gear 19 and can be rotated together with the output gear about the rotation axis 2 or about the central axis. A second transmission output shaft 34 is positioned in rotationally fixed and coaxial manner in the second output gear 20 and can be rotated together with the output gear about the rotation axis 2 or about the central axis.

The first sun gear 10 is the first input shaft 35 of the drive unit and the rotating speed reduction stage 6 and is therefore connected in torque-proof manner with the rotor shaft 21. The first planet carrier 12 is the output shaft 36 of the rotating speed reduction stage 6 and is connected in torque-proof manner with the input shaft 37 of the sub-transmission 7. The second sun gear 15 is an input shaft 37 of the sub-transmission 7. The second input shaft 37 can be rotated with the output shaft 36 about the rotation axis 2 or central axis. For this purpose, the planet carrier 12, designed as output shaft 36, is fixed on a hub of the second sun gear 15.

The output generated through the electromotive drive 4 is conducted via the transmission 5 to the transmission output shaft 33 and 34. The first sun gear 10 is directly driven by the rotor shaft 21. The rotating speeds applied at the first sun gear 10 are reduced in the rotating speed reduction stage 6 to the first planet carrier 12. This results in the input shaft 35 always rotating faster than the output shaft 36. The power applied at the output shaft 36 and simultaneously at the second input shaft 37 is transferred via the second planetary drive 14 to the housing 18 of the differential and from there distributed to the transmission output shafts 33 and 34, depending on the driving condition.

The space surrounded by the housing 23 of the drive unit 1 is divided in at least two chambers 38 and 39. For example, the electric motor is located in the first chamber 38. The transmission 5 is arranged in the second chamber 39. It is assumed that chamber 38 is dry and chamber 39 is supplied at least partially with lubricating oil and therefore wet. The seal 41 keeps the chambers 38 and 39 sealed from one another, so that lubricating oil cannot penetrate the dry chamber 38. Lubricating oil from the transmission 5 should also be prevented from flowing into the gap 40 through the gap to the outside. The gap 40 is located inside between the rotor shaft 21 and the surface of the transmission output shaft 33. The gap 40 is an annular clearance and can be formed alternatively by multiple axial slots in combination with an annular clearance.

Figure 2:
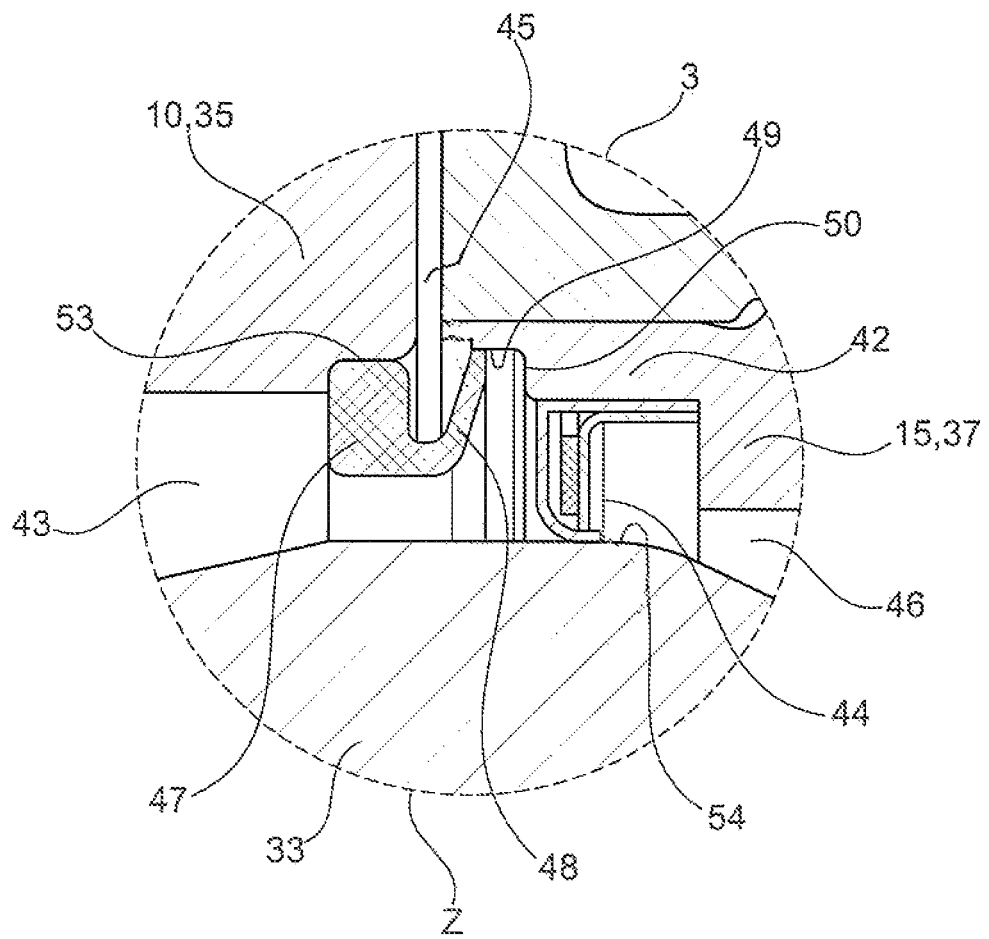
FIG. 2 shows an enlarged, non-scale detail Z of an embodiment of a sealing arrangement 3. The rolling bearings 24, 25, 26, 27, 28 and 29 shown in FIG. 1 are not outlined in detail but are depicted symbolically.

Referring to FIG. 2, the radial gap 40 is formed radially between the rotor shaft 21 and the transmission output shaft 33 and sealed by means of a sealing arrangement 3 (FIG. 2) from the transmission 5. Out of the chamber 39 starting from the transmission 5 a third annular clearance 46 leads into a first annular clearance 43. The first annular clearance 43 leads in the direction of the gap 40. The third annular clearance 46 is located radially between the second input shaft 35 and the transmission output shaft 33. The first annular clearance 43 is located radially between the first input shaft 35 and the transmission output shaft 33. Between the first annular clearance 43 and the third annular clearance 46 a first seal 44 of the sealing arrangement 3 is arranged. The seal seat of the first seal 44 is located in the second sun gear 15 and is attached in a sealing manner to a sealing surface 54 of the surface of the transmission output shaft 33. A second annular clearance 45 is arranged axially between the front end of the first sun gear 10 and the first planet carrier 12, and arranged between the front end of the first sun gear 10 and a bundle 42 of the second sun gear 15. Annular clearance 45 leads from the chamber 39 to the first annular clearance 43, which leads to the gap 40 (via the first annular clearance 43). A second seal 47 is positioned in a seal seat 53 in the first sun gear 10 (the first input shaft 35) and bridges the second annular clearance 45 with a sealing lip 48. As shown, the sealing lip 48 is attached at an inner cylindrical sealing surface 49 in the second sun gear 15 (in the second input shaft 37). Alternatively, the sealing lip 48 can also be attached axially in preloaded manner to an annular sealing surface 50 of the second sun gear 15, which faces in axial direction. The sealing arrangement 3 comprises a third seal 51 (see FIG. 1), which is designed in the form of an O-ring, and which seals the first annular clearance 43 toward the transmission 5 at a form-fit and/or frictional seat 52. The seat 52 is sealed between the rotor shaft 21 and the first input shaft 35. The seals 44, 47 and 51 and the gap 40, 43 and 46 are arranged coaxially on the rotation axis 2 or on an extension of the rotation axis.

Figure 3:
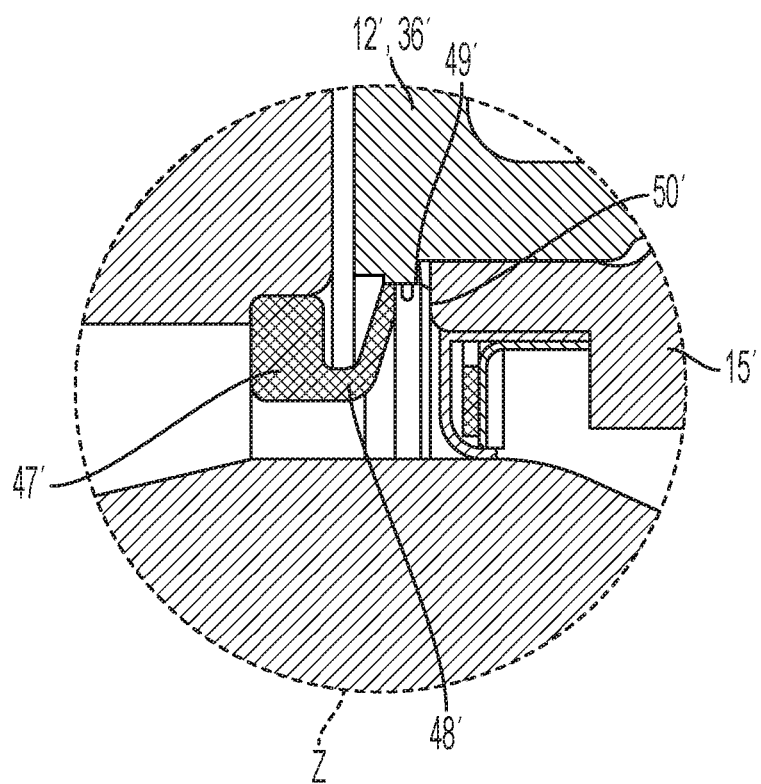
FIG. 3 shows an enlarged, non-scale detail Z of an alternative embodiment of a sealing arrangement.

Referring to FIG. 3, it is also possible that the sealing surfaces 49' or 50' are located at the output shaft 36', i.e., at the first planet carrier 12'. That is, a seal 47' may have a second portion 48' that engages with the output element 36' of the first planetary gear set, e.g., the first planet carrier 12', rather than the second sun gear 15' as was shown in FIG. 2.

REFERENCE NUMERALS

1 Drive unit
2 Rotation axis
3 Sealing arrangement
4 Electromotive drive
5 Transmission
6 Rotating speed reduction stage
7 Sub-transmission
8 Differential
9 First planetary drive
10 First sun gear
11 First planetary gear
12 First planet carrier
12a First side of the planet carrier
12b Second side of the planet carrier
13 First ring gear
14 Second planetary drive
15 Second sun gear
16 Second planet carrier
16a Mounting plate of the second planet carrier
17 Second ring gear
18 Housing of the differential
19 Output gear
20 Output gear
21 Rotor shaft
22 Rotor
23 Housing of the drive unit
23a First housing section
23b Second housing section
24 Rolling bearing
25 Rolling bearing
26 Rolling bearing
27 Rolling bearing
28 Rolling bearing
29 Rolling bearing
30 First planetary bolt
30a Bolt axis
31 Second planetary gears
32 Second planetary bolt
32a Bolt axis
33 First transmission output shaft
34 Second transmission output shaft
35 First input shaft
36 Output shaft
37 Second input shaft
38 First chamber
39 Second chamber
40 Gap
41 Seal
42 Bundle of the second sun gear
43 First annular clearance
44 First seal
45 Second annular clearance
46 Third annular clearance
47 Second seal
48 Sealing lip
49 Sealing surface
50 Sealing surface
51 Third seal
52 Seat
53 Seal seat
54 Sealing surface

What is claimed is:

1. A drive unit comprising:
an electromotive drive including a rotor shaft defining an axis;
a transmission including:
a first planetary gear set supported for rotation about the axis and having a first input element coupled to the rotor shaft and a first output element operably coupled to the first input element such that a rotational speed of the first output element is slower than the first input element when the first planetary gear set is rotating,
a second planetary gear set supported for rotation about the axis and having a second input element coupled to the first output element and a second output element operably coupled to the second input element such that a rotational speed of the second output element is slower than the second input element when the second planetary gear set is rotating, and an output shaft supported for rotation about the axis and operably coupled to the second output element; and a seal disposed between the first input element and the output shaft and having a first portion engaging with the first input element and a second portion engaging with one of the first output element and the second input element.

2. The drive unit of claim 1, wherein the second portion of the seal engages with the second input element.

3. The drive unit of claim 1, wherein the first and second input elements are sun gears, and the first and second output elements are planet carriers.

4. The drive unit of claim 1, wherein the first input element, the second input element, and the first output element are arranged such that an annular clearance is defined between the first input element and the second input element and between the first input element and the first output element, and wherein a gap is formed between the rotor shaft and the output shaft, and wherein the seal blocks a fluid path between the clearance and the gap to prevent fluid from entering into the gap.

5. The drive unit of claim 1, wherein the second input element defines a sealing surface and the seal is seated on the sealing surface.

6. The drive unit of claim 1, wherein the first input element is fixed to the rotor shaft, and the first output element is fixed to the second input element.

7. The drive unit of claim 1, wherein the first portion of the seal is fixed to the first input element.

8. The drive unit of claim 1 further comprising a second seal having a first portion engaging the output shaft and a second portion engaging the second input element.

9. The drive unit of claim 8, wherein the second seal is seated in the second input element.

10. The drive unit of claim 8, wherein the seal and the second seal are coaxial and are supported for rotation about the axis.

11. The drive unit of claim 1, wherein the first portion of the seal is seated in the first input element.

12. The drive unit of claim 1 further comprising a second seal engaging between the rotor shaft and the first input element.

13. The drive unit of claim 1 further comprising a differential operably coupled to the second output element and including a gear fixed to the output shaft.

14. A drive unit comprising:

a housing having an interior with a first chamber and a second chamber;

an electromotive drive disposed in the first chamber and including a rotor shaft defining an axis, wherein the rotor shaft is hollow and defines a bore;

a transmission disposed in the second chamber and including an output shaft extending through the bore such that a gap is defined between the bore and the output shaft, the transmission further including a gearing arrangement that operably couples the output shaft to the rotor shaft and reduces a speed ratio between the rotor shaft and the output shaft so that the output shaft rotates slower than the rotor shaft when operating, wherein the gearing arrangement includes a first element fixed to the rotor shaft and a second element that rotates slower than the first element when operating, wherein an annular clearance is defined between the first element and the second element and concentric with the axis; and an annular seal supported for rotation about the axis and having a first portion engaging with the first element and a second portion engaging with the second element to inhibit fluid flow between the gap and the annular clearance.

15. The drive unit of claim 14 further comprising a second seal supported for rotation about the axis and having a first portion engaging with a third element of the gearing arrangement and a second portion engaging with the output shaft to prevent fluid flow between first chamber and the second chamber.

16. The drive unit of claim 15, wherein the output shaft rotates slower than the third element.

17. The drive unit of claim 14, wherein the gearing arrangement is at least one planetary gear set.

18. The drive unit of claim 17, wherein the first element is a sun gear and the second element is a planet carrier, and the first and second elements are part of a same planetary gear set.

19. The drive unit of claim 14, wherein the first element is a first sun gear associated with a first planetary gear set, and the second element is a second sun gear associated with a second planetary gear set.

* * * * *